Figure 4:
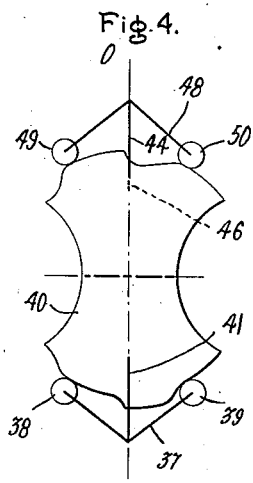

Sept. 1, 1942.                  W. BLACK ET AL                    2,294,769
                MECHANICAL TRANSMISSION FOR AUTOMOTIVE VEHICLES
                    Filed March 19, 1940            2 Sheets-Sheet 1
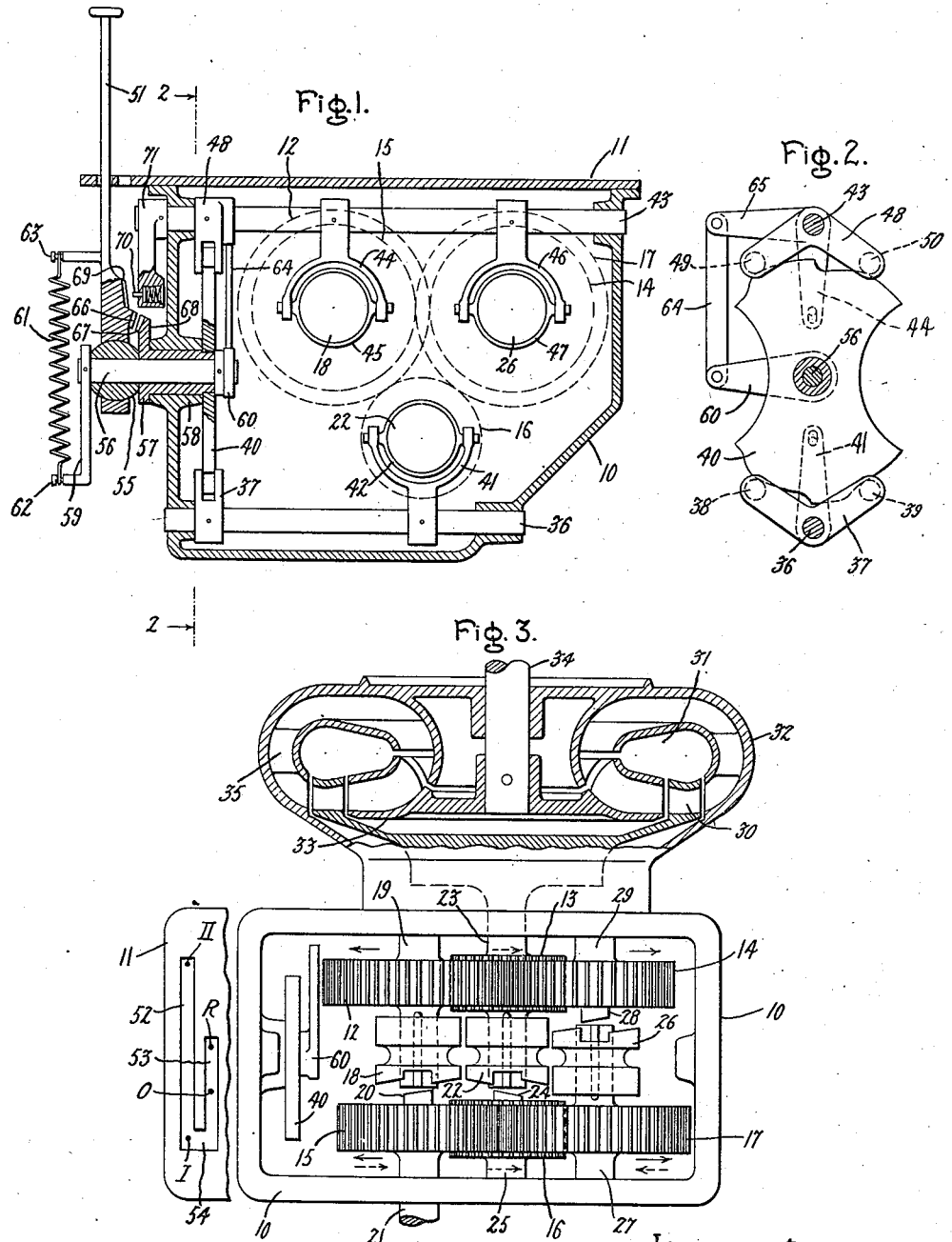
Inventors:
Willy Black,
Walter Lenz,
Rudolf Fichtner
by Harry E. Dunham
Their Attorney.

Sept. 1, 1942.　　　W. BLACK ET AL　　　2,294,769
MECHANICAL TRANSMISSION FOR AUTOMOTIVE VEHICLES
Filed March 19, 1940　　　2 Sheets—Sheet 2

Inventors:
Willy Black,
Walter Lenz,
Rudolf Fichtner
by Harry E. Dunham
Their Attorney.

Patented Sept. 1, 1942

2,294,769

UNITED STATES PATENT OFFICE 2,294,769

MECHANICAL TRANSMISSION FOR AUTOMOTIVE VEHICLES

Willy Black, Berlin-Halensee, Walter Lenz, Berlin-Reinickendorf, and Rudolf Fichtner, Berlin, Germany, assignors to General Electric Company, a corporation of New York Application March 19, 1940, Serial No. 324,890
In Germany December 24, 1938

5 Claims. (Cl. 74—360)

Our invention relates to mechanical transmissions for automotive vehicles, and more particularly to mechanical multi-speed transmissions operable with hydraulic couplings.

One object of our invention is to provide an improved mechanical multi-speed transmission in which speed changes may be made under the load conditions imposed by a hydraulic gear.

For a better understanding of our invention, together with other and further objects thereof, reference is had to the following description, taken in connection with the accompanying drawings, and its scope will be pointed out in the appended claims.

In the accompanying drawings, Fig. 1 is an end elevation of the transmission and a partial cross sectional elevation of the speed changing mechanism; Fig. 2 is an end view of a part of the speed changing mechanism looking in the direction of arrows 2—2 in Fig. 1. Fig. 3 is a plan view of the hydraulic gear and of the mechanical transmission; Figs. 4, 5, 6, 7 and 8 are diagrammatic views indicating the relative positions of the elements of the speed changing mechanism in its several positions.

Referring to Figs. 1 and 3 in detail, the transmission built in accordance with our invention includes a set of gears arranged in two parallel trains within a casing 10 provided with a cover 11, only a portion of which is shown in Figure 3. The gears are arranged in two parallel trains having gears 12, 13, and 14 in one train; and gears 15, 16, and 17 in the second train. In these parallel trains, gear 12, the largest gear in the first train, is in engagement with gears 13 and 14, and gear 17, the largest gear in the second train, is in engagement with gears 15 and 16. Furthermore, the gears are arranged in pairs on coaxial shafts with clutches between the gear shafts to establish connections, between coaxial gears, for transmitting power from one train of gears to the other through the connected pair. Gears 12 and 15 are coaxially arranged and are connected by a sliding clutch member 18 mounted on the shaft 19 of the gear 12 and operable to engage clutch teeth 20 on the shaft 21 of the gear 15. The gears 13 and 16 are coaxially arranged and may be connected, to rotate together, by a sliding clutch member 22 mounted on the shaft 23 of the gear 13. The clutch member 22 may be axially moved along the shaft 23 to engage clutch teeth 24 on the shaft 25 of the gear 16. The gears 14 and 17 are coaxially arranged, a clutch member 26 being slidable along the shaft 27 of gear 17 to engage the clutch teeth 28 on the shaft 29 of the gear 14.

In the gear trains above described, the shaft 21 is the driven shaft of the transmission and the shaft 23 is the drive shaft, it being attached to the turbine wheel 30 of a hydraulic coupling 31. The hydraulic coupling is of the Föttinger type consisting of a casing 32 enclosing a pump wheel 33 mounted on a shaft 34 driven by a prime mover of the vehicle. The pump wheel 33 circulates a fluid within the casing 32 of the hydraulic coupling projecting such fluid against the turbine wheel 30, which fluid is returned to the pump wheel by directing vanes 35 within the casing 32. This type of hydraulic coupling is disclosed in detail in U. S. Patents 1,199,359 and 1,199,360 issued to Föttinger. Although the shaft 23 of gear 13 is herein used as the turbine and drive shaft, it is possible, and under certain conditions it may be desirable, to connect the turbine wheel to the shaft 19 or to the shaft 29. The mechanism for moving the clutch members 18, 22, and 26 to thereby effect speed changes, is illustrated in Figs. 1 and 2. In Fig. 1, a side view of the gearing is illustrated, the relationship of the gear axes being clearly illustrated. The axis of the gears 13 and 16 is below the axes of the other two pairs of gears, which are horizontally on the same plane. The clutch 22, between the gears 13 and 16, is operated through a shaft 36 pivoted in the walls of the casing 10 and actuated by a bell crank 37 mounted next to the inside of a wall of the casing 10. The bell crank is provided with rollers 38 and 39 which engage the surface of a cam 40. The clutch member 22 is connected for operation by the shaft 36 through a yoke 41 and a collar 42. The yoke 41 is rigidly connected to the shaft 36 so as to rotate with the shaft, and the collar 42 is pivoted to the yoke, the collar being loosely mounted in a suitable groove in the periphery of the clutch member 22, which arrangement provides for axially moving the clutch member when the yoke is moved by the shaft. The surface of the cam 40 is designed to effect a movement of the shaft 36 responsive to a rotation of the cam to operate the clutch member between an open and a closed position.

The clutch members 18 and 26 are operated through a single shaft 43. A yoke 44 and collar 45 effect a movement of the clutch 18, and a yoke 46 and a collar 47 effect a movement of the clutch 26. The clutches 18 and 26 are arranged to move to closed position in opposite directions. The rotation of the shaft 43 in a clockwise direction effects a closure of the clutch 26 and a counter-clockwise rotation of the shaft effects a closure of the clutch 18, an intermediate position being provided for holding both clutches open simultaneously. The shaft 43 is actuated by a bell crank 48 rigidly connected to the shaft and provided with rollers 49 and 50 which engage a surface of the cam 40. The surfaces of the cam are so arranged that predetermined rotation of the cam effects, in part, a sequential operation of the three clutches.

The movement of the clutch members is initiated by a speed change lever 51. This lever projects through an interconnected pair of parallel guide slots 52 and 53 in the cover 11, one of which slots is shorter than the other and the interconnection between the two slots being accomplished at one end of the two slots by a cross slot 54. The lever is pivoted upon a spherical member 55, so that it may move in either of the two parallel slots and also through the cross slot 54, the movement in the latter slot being at right angles to the movement in the parallel slots. The spherical member 55 is mounted on a shaft 56 which is arranged at right angles to the slots 52 and 53 and projects through a sleeve 57 into the casing 10. The sleeve 57 is mounted in a bushing 58 in the wall of the casing 10 and also projects into the casing having mounted, at its inner end, the cam 40 for rotation with the sleeve. The shaft 56 is provided with a crank arm at each of its two ends. At its outer end, the crank arm 59 is provided, and at its inner end, a crank arm 60 is provided. The crank arm 59 is connected to the lever 51 by a spring 61. The spring 61 is attached at one end to the crank arm 59 by a lug 62 and is attached at its other end to a lug 63 on the lever 51. The crank arm 59 and the lever 51 extend in opposite directions from the axis of the shaft 56. The spring 61, therefore, consists of an overcenter, or toggle, connection whereby a movement of the lever 61 past the axis of the shaft 56 changes the direction of pull on the arm 59, thereby shifting the crank to a position corresponding to the position of the lever 51. A simple movement of the lever 51, therefore, effects a change in position of the crank arm 59 and, through a link connection, changes the position of the shaft 43. The link connection between shafts 56 and 43 consists of the crank arm 60 on the inner end of the shaft 56, a link 64 and a crank arm 65 connected to the hub of the bell crank 48. This connection between the shafts 56 and 43 provides for a movement of the shaft 43 in response to the movement of the lever 51. The operation of this toggle connection is dependent upon the tension of spring 61, and a movement of the shaft is possible only when the cam 40 is moved to a predetermined position. When the pull of the spring is sufficient to overcome the friction of the closed clutch connection the shaft is moved to open this clutch and when the speeds of the gears to be connected by the new clutch connection are substantially equal the shaft 43 is moved to establish this connection. In the position of the cam 40 illustrated in Fig. 2, no movement of the shaft 43 is possible, because the rollers 49 and 50 of the bell crank 48 are shown in contact with the cam surface.

As above stated, the lever 51 may move in slots 52 and 53 at right angles to the axis of the shaft 56, and it may move parallel to the axis of this shaft through the connecting slot 54 because of its spherical mounting on the member 55. In Fig. 1, the lever is illustrated as being in the slot 52, and in this position being able to effect opposite torques on the shaft 43 dependent upon its movement within this slot.

The lever 51 is also provided with a slot 66 arranged opposite to a tooth 67 on an arm 68 attached to the sleeve 57. When the lever 51 is moved through the slot 54 in a plane parallel to the axis of the shaft 56, the slot 66 and tooth 67 engage, the sleeve 57 having been moved and left in the proper position by a previous movement of the lever 51 in the slot 53 and through the slot 54. A subsequent movement of the lever in slot 53 moves the sleeve 57 and cam 40 to corresponding positions of the lever 51.

The lever 51 is further provided with a tooth 69 arranged opposite to a retractable pin 70 projecting from the end of a crank lever 71 mounted on the end of the shaft 43, the crank lever 71 being on the outside of the casing 10. When the lever 51 is moved in the slot 53 toward slot 54, the pin 70 is engaged by the tooth 69 on the lever 51 only during a portion of the travel of the lever 51 in this slot. This operation will be treated in greater detail in the description of operation of the gear shifting mechanism.

Figure 5:
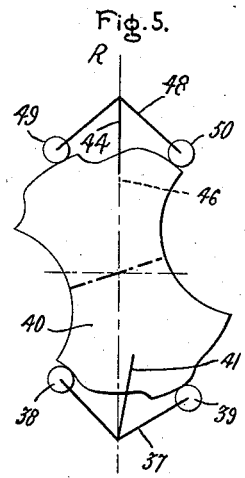
Figure 6:
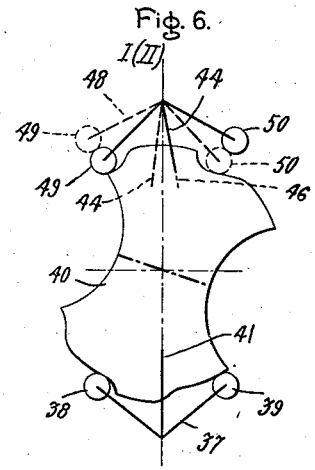
Figure 7:
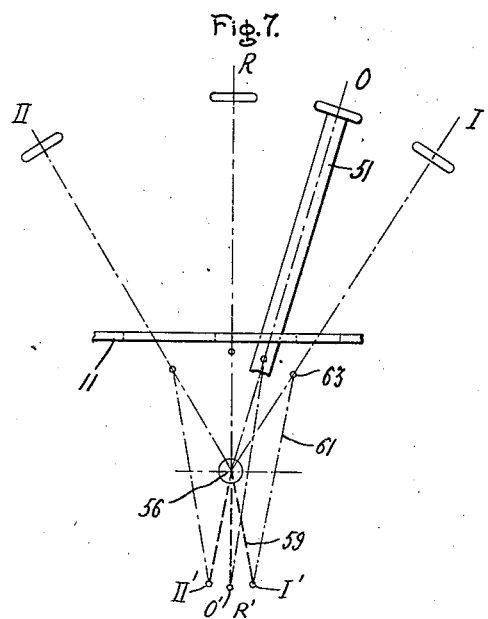
Figure 8:
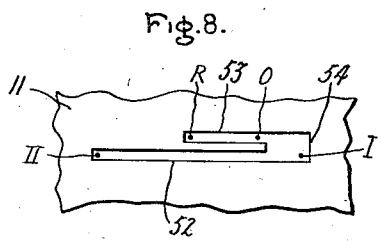

The operation of the gear shifting mechanism may best be described by reference to the diagrams Figs. 4, 5, 6, and 7, together with Fig. 8. Figs. 4, 5 and 6 are views of the cam 40 looking in the direction of the arrows 2—2 of Fig. 1. Fig. 4 illustrates the position of cam 40 when the shift lever 51 is in the position O, as illustrated in Figs. 7 and 8. In this position of the cam, the bell cranks 37 and 48 are held in their mid positions, the cam surface being so designed that the rollers contacting these cam surfaces are thereby held in their respective mid positions in which the clutch arms are held in an intermediate open clutch position. The clutches 18, 22, and 26 are each open, and no power is transmitted from the turbine shaft 23 to the output, or the driven shaft 21.

In Fig. 5, the shift lever 51 is assumed to be in the position R as indicated in Figs. 7 and 8. To assume this position, the lever 51 was moved in slot 53 to the left of its previous position O. In so moving the lever, the cam 40 also was moved in a counter-clockwise direction into the position shown in Fig. 5 by the slot and tooth connection 66—67. As pointed out above, the slot and tooth connection is closed so long as lever 51 is in the slot 53. In this position (Fig. 5) of the cam 40, the bell crank 48 still remains in its previous position and the clutches 18 and 26 also remain in their open positions. The bell crank 37, however, is positively moved to the right of its center position, by the cam surface, and clutch 22 is correspondingly moved to its closed position. In this arrangement of the clutches power is transmitted from the turbine shaft 23 through the clutch member 22, clutch teeth 24 to gear 16. The gear 16 is in engagement with gear 17 and gear 17 is in engagement with gear 15, the latter being mounted on the shaft 21. The direction of rotation of the shaft 21 is indicated by a dotted arrow and obtains a reverse operation of the vehicle.

Fig. 6 indicates a position of the cam 40 corresponding to the position I of the lever 51 and is indicated in Figs. 7 and 8. In this position, the lever 51 is at the extreme right end of the slots 52 and 53, and therefore, registers with the cross slot 54. The cam 40 has been moved clockwise by the lever 51 through the registration of the slot and tooth connection 66—67. The bell crank 37 has been positively returned to its former and open position by the cam 40, in which position the clutch 22 is open and is maintained in that position though the cam is moved beyond the first position. Furthermore, the tooth 69 positively engaging the pin 70, positively moves the crank 71 to a position at which the clutch 18 is in its closed position. In Fig. 6, the bell crank 48 is illustrated by full lines as being in a position corresponding to the closed clutch 18 position. In this position, however, the roller 49 is in contact with the cam surface and roller 50 is out of contact with the cam surface whereby a rotation of the bell crank becomes possible between the full line and dotted line positions shown in Fig. 6 without changing the position of cam 40. At this position of the lever 51 in slot 53, it may be moved into slot 52 through slot 54 and in so moving the connections 66—67 and 69—70 are broken. When these connections are broken, the cam 40 remains in its position, as illustrated in Fig. 6, there being no force tending to move it. The crank arm 71, together with clutch 18, remains in this position, however, due to the operation of the spring 61. In Fig. 7, it is shown that the movement of the lever 51 to its position I moves the anchoring lug 63 far to the right of the shaft 56, and thereby exerts a counter-clockwise pull on the crank 59. The shaft 43, together with bell crank 44, having been moved in a counter-clockwise position by the positive force exerted upon the crank 71 at the pin 76 is held there by the pull of spring 61, the movement being limited by the roller 49 engaging the cam surface 40.

The lever 51 may be moved to position II in the slot 52, and thereby through its toggle connection with the clutch shaft 43 effecting a closure of the clutch 26 and an opening of the clutch 18. In Fig. 7, crank arm 59 is illustrated as having assumed the position II'. This position, however, is not immediately assumed for the reason that there is no positive movement of this crank when the lever 51 is shifted from position I to II. In order to effect a change of the clutches at this time, the pull of the spring 61 must overcome the friction between the clutch 18 and teeth 20, due to the transmission of power through the clutch. It is necessary, therefore, in this instance to reduce the fuel input to the prime mover until the torque transmitted through the hydraulic coupling approaches zero. The spring 61 overcomes the coupling friction before this torque becomes zero, and moves the shaft 43 clockwise in an attempt to close the clutch 26. The gears 12 and 15 at this time run at the same speed, but because of the gear ratio, gear 14 runs faster than the gear 17. The coupling 26 can, therefore, not engage its cooperating teeth 28, and to prevent such engagement, the clutch teeth are angularly arranged relatively to the clutch member 26 to move the member 26 out of engagement. A further reduction of the fuel input of the prime mover, however, and a corresponding reduction in the speed of gear 14 permits such closure of the clutch 26 and the crank arm 59 assumes the position II' illustrated in Fig. 7.

In position I of the shaft lever 51 and in closed position of the clutch 18, power is transmitted from the turbine shaft 23 through gears 13 and 12 to the clutch 18 and 20 directly to the driven shaft 21. In position II, the power transmission takes place from the shaft 23 through the gears 13, 12, and 14, through clutch members 28, 26, to gear 17, and to the engaging gear 15 and shaft 21.

With the above arrangement of clutches, a change of the various gear connections can be accomplished without fully stopping the turbine shaft 23. It is impractical in hydraulic drives to withdraw the operating fluid so that even at idling speeds of the prime mover a slight torque is exerted and the shaft 23 continually rotates. In an ordinary gearing, therefore, the changing of speeds is impractical. With our above described gearing, however, the difficulties are fully overcome and gear changes are accomplished without undue wear on the gears themselves.

What we claim as new and desire to secure by Letters Patent of the United States is:

1. In a mechanical gear transmission of the multi-speed type, including parallel trains of gears, said gears being arranged in coaxial pairs and clutching means operable to connect said coaxial gears respectively to transmit power between said trains of gears, the combination of a shift lever, operating mechanisms for said clutches operable by said lever to positively close certain of said clutches, and resilient operating means connected between said lever and said mechanism for closing others of said clutches.

2. In a multi-speed gear transmission, including a pair of parallel gear trains, the corresponding gears of said trains being coaxially arranged and clutch members between said coaxial gears, the combination of a shift lever operable in several planes, a cam, means cooperating with said cam and said lever for moving said cam and positively operating predetermined ones of said clutches when said lever is moved in one plane, and resilient means cooperating with said lever for moving predetermined others of said clutches independently of said cam when said shift lever is moved in a predetermined other plane.

3. In a multi-speed gear transmission operable under partial load, including a pair of parallel gear trains having corresponding gears on common axes and clutching means for connecting said coaxial gears respectively, the combination of a shift lever, means including a cam operable to positively close one of said clutches, means cooperating with said lever for moving said cam, means cooperating with said lever to positively move another of said clutches to closed position, and resilient means connected between said lever and said second clutch to open said second clutch and close a third clutch subsequent to an operation of said lever to a predetermined position and upon the reduction of the torque transmitted through said second clutch to a predetermined value.

4. In a multi-speed gear transmission including a reversing gear and clutches for effecting speed changes and reversing operation, the combination of a pivoted actuating lever operable in either of two planes, a spring toggle connection between said lever and said speed change clutches whereby said clutches are operated by the force of the toggle spring responsive to a movement of the lever in one of its planes, a cam pivotally mounted and arranged to maintain a predetermined operating relationship between the clutches in each of its several positions, and means for establishing an operating connection between said actuating lever and said cam when said actuating lever is moved to its second plane of operation to effect an operation of said reversing clutch.

5. In a multi-speed gear transmission including a reversing gear and clutches for operating said gears, the combination of a shift lever operable in two planes, a cam operable to move positively said reversing gear clutch into closed and into open position while simultaneously maintaining the multi-speed gear clutches in neutral positions, means for establishing an operating connection between said cam and said shift lever when the said lever is moved to one of its operating planes thereby effecting an operation of said reversing gear clutch and a spring toggle connection between said lever and the multi-speed gear clutches to effect an operation of said last mentioned clutches in response to the said spring toggle when said shift lever is moved to its second plane of operation.

WILLY BLACK.
WALTER LENZ.
RUDOLF FICHTNER.